(12) United States Patent
Weber

(10) Patent No.: US 8,414,364 B2
(45) Date of Patent: Apr. 9, 2013

(54) KNIFE HOLDING APPARATUS

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 0 days.

(21) Appl. No.: 12/598,021

(22) PCT Filed: Apr. 29, 2008

(86) PCT No.: PCT/EP2008/003472
§ 371 (c)(1),
(2), (4) Date: Feb. 23, 2010

(87) PCT Pub. No.: WO2008/135205
PCT Pub. Date: Nov. 13, 2008

(65) Prior Publication Data
US 2010/0186569 A1    Jul. 29, 2010

(30) Foreign Application Priority Data

May 4, 2007    (DE) .................... 10 2007 021 071
Aug. 3, 2007   (DE) .................... 10 2007 036 688

(51) Int. Cl.
*A22C 21/00*  (2006.01)
(52) U.S. Cl. ............................................ 452/127
(58) Field of Classification Search ............. 452/125, 452/127–130, 136, 104, 133; 99/589–591, 99/588, 485, 486, 537–540, 489–492
See application file for complete search history.

(56) References Cited

U.S. PATENT DOCUMENTS

| | | | |
|---|---|---|---|
| 3,340,916 A | | 9/1967 | Burch |
| 3,360,026 A | * | 12/1967 | Schill ............... 452/127 |
| 3,769,903 A | * | 11/1973 | Greider ............ 452/127 |
| 3,934,310 A | * | 1/1976 | Bartels et al. .... 452/127 |
| 5,211,097 A | | 5/1993 | Grasselli |
| 6,299,523 B1 | * | 10/2001 | Wonderlich et al. ..... 452/127 |
| 6,357,346 B1 | * | 3/2002 | Townsend ........... 99/589 |
| 7,169,034 B2 | | 1/2007 | Schill |
| 7,172,502 B1 | * | 2/2007 | Bergman et al. .... 452/129 |
| 2004/0198207 A1 | | 10/2004 | Schill |

FOREIGN PATENT DOCUMENTS

| | | |
|---|---|---|
| DE | 1 161 173 | 1/1964 |
| DE | 1 507 980 | 3/1970 |
| DE | 20 12 724 B2 | 10/1971 |
| DE | 31 38 912 A1 | 4/1983 |
| DE | 35 41 640 A1 | 5/1987 |
| DE | 40 25 600 A1 | 2/1992 |
| DE | 100 38 579 A1 | 4/2002 |
| DE | 101 23 811 A1 | 11/2002 |
| EP | 1 304 927 B1 | 7/2001 |
| WO | WO 02/11546 A1 | 2/2002 |

* cited by examiner

*Primary Examiner* — Richard Price, Jr.
(74) *Attorney, Agent, or Firm* — Kilpatrick Townsend & Stockton LLP

(57) ABSTRACT

The invention relates to a knife holding device, particularly for derinding machines, comprising a knife holder (11) with a lower part (13) and an essentially plate-shaped clamping element, the clamping element being displaceable between a clamping position and a release position in order to optionally clamp or release a knife blade (17) to be inserted between the lower part and the clamping element, and a tensioning device (19, 53) engaging with the clamping element for adjusting the clamping element between the release position and the clamping position. According to the invention, the lower part comprises a counter bearing (21) for the clamping element, said counter bearing cooperating with the clamping element such that the clamping element executes a rotational or tilting movement about the counter bearing during adjustment.

21 Claims, 7 Drawing Sheets

Figure 1:
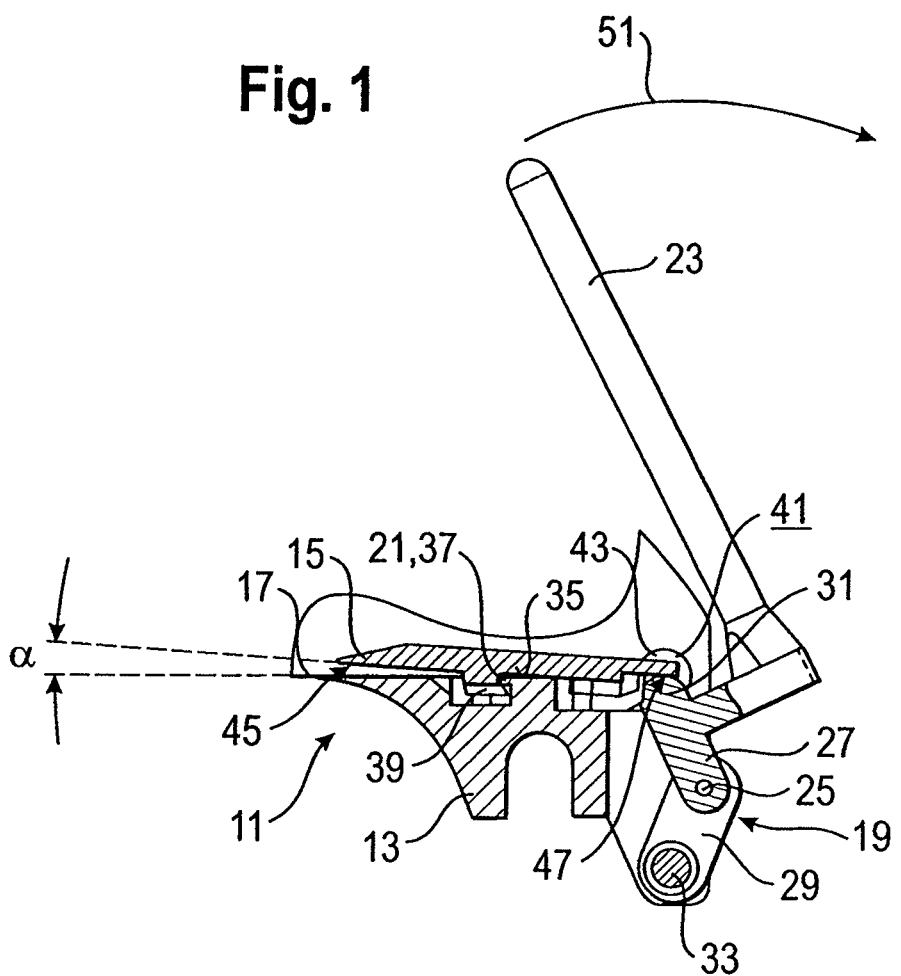

Fig. 5
a)
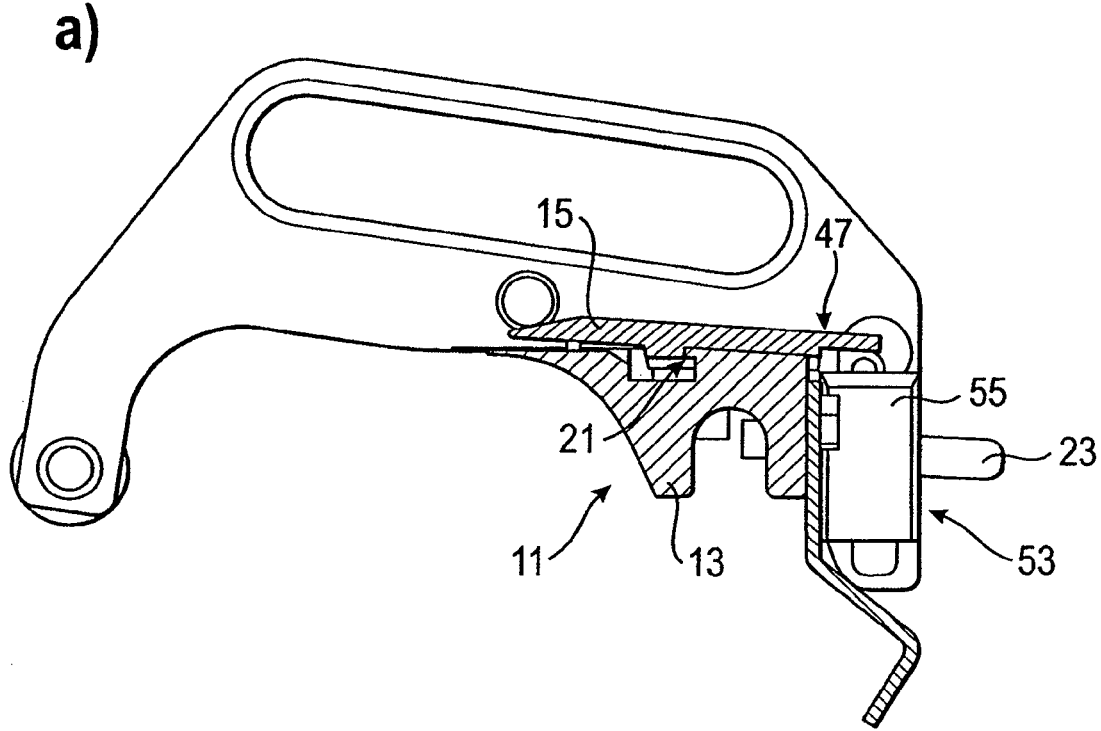
b)
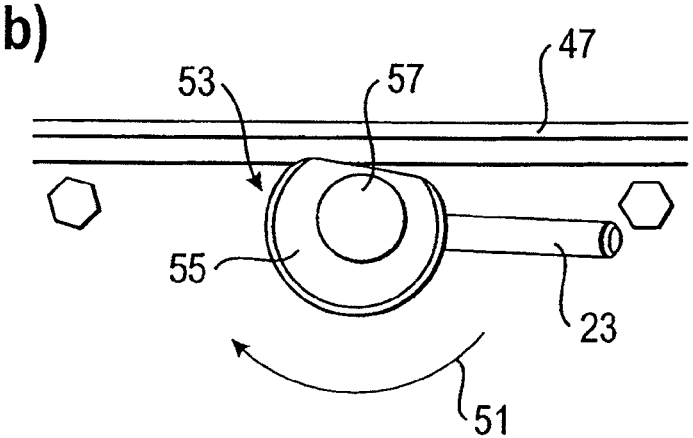

Fig. 6
a)
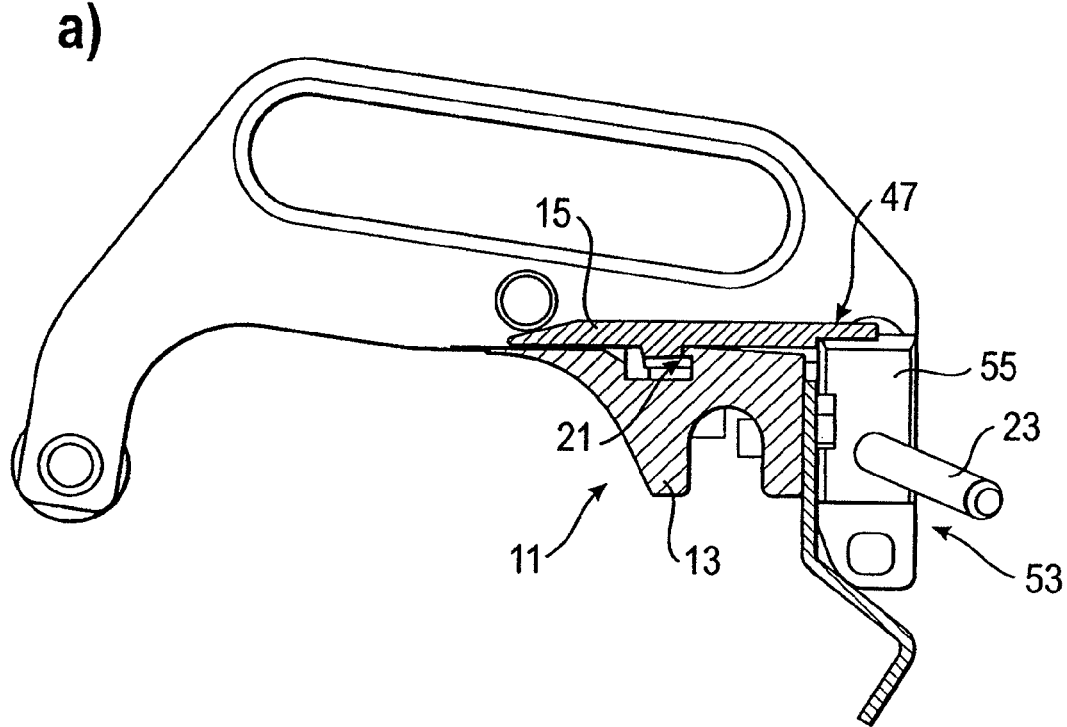
b)
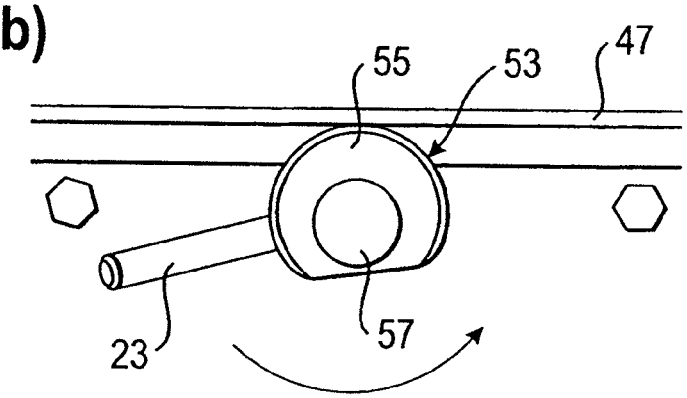

KNIFE HOLDING APPARATUS

CROSS-REFERENCE TO RELATED APPLICATIONS

This application is a National Stage of International Application No. PCT/EP2008/003472 filed Apr. 29, 2008, and which claims the benefit of German Patent Applications Nos. 10 2007 021 071.1, filed May 4, 2007, and 10 2007 036 688.6, filed Aug. 3, 2007, the disclosures of which are incorporated herein by reference.

The invention relates to a knife holding apparatus having a knife holder which has a lower part and a clamping element, which is in particular of plate shape, wherein the clamping element is adjustable between a clamping position and a release position to selectively clamp or release a knife blade insertable between the lower part and the clamping element.

Such knife holders are, for example, provided at derinding machines, but can generally also be used in a different environment.

The derinding of a meat product having a rind by means of a derinding machine can proceed as follows, for example: The meat product is placed by hand with the rind side onto an infeed belt which transports the meat product toward a toothed roller and toward a pressure roller so that the rind is pulled beneath the knife holder by the toothed roller and can be cut off by means of the knife blade. The derinded meat product is then transferred to an outfeed belt. The rind is removed from the toothed roller by a scraper comb and falls downward into a container.

With known knife holding apparatus, the clamping element can be founded to the lower part via separate fastening means for the clamping of the knife blade. If the knife blade should be replaced, the fastening means must be released beforehand in a time-consuming manner by means of suitable tools.

It is therefore the object of the invention to provide an apparatus of the initially named kind in which the knife blade can be replaced in a manner which is as simple as possible, with in particular a simple cleaning of the knife holder additionally being possible.

This object is satisfied by an apparatus having the features of claim 1 and in particular in that a clamping device engaging at the clamping element is provided for the adjustment of the clamping element between the release position and the clamping position, with the lower part having a counter support for the clamping element which cooperates with the clamping element such that the clamping element carries out a rotary movement or tilting movement about the counter support on the adjustment.

The counter support of the knife holding apparatus in accordance with the invention cannot only be made to hold the clamping element at the lower part, i.e. to secure against a release from the lower part on the adjustment, but rather additionally serves to cause the clamping plate to make a rotary movement or tilting movement when the clamping element is actuated by the clamping device. A sufficiently high clamping force can be applied onto the knife blade via the clamping device with a relatively small force expenditure due to the rotary movement or tilting movement which the clamping element carries out on the adjustment between the release position and the clamping position.

The clamping element can be adjusted back into the release position in which the knife blade can be removed by a reverse actuation of the clamping device. The invention thus in particular enables a blade change without tools which can thus be carried out fast and simply.

The clamping device preferably has a length-changeable joint arrangement which is in particular adjustable between a stretched and a kinked position. The joint arrangement can in particular be a toggle lever, also claimed independently here, which is adjustable by means of an actuation lever, for example. The toggle lever can comprise two one-armed clamping lever which are connected to one another by a joint and which are likewise journaled in a jointed manner at their ends disposed opposite the joint. A quick-clamping device can be realized in a simple manner by a toggle lever. The toggle lever allows a high power gear ratio so that high tension forces or clamping forces can be achieved.

The clamping device can also have an eccentric device. An eccentric device is in particular to be understood in this respect as a control disk which is rotatable about an axis or which is attached to a shaft and whose center is spaced apart from the axis or is disposed outside the shaft axis and which includes a cam follower which in particular has a circular shape or the shape of a part circle. The control disk can in this respect also have an outer periphery (cam follower) differing from a circular shape, i.e. the control disk or its cam follower can also be made asymmetrical or out of round.

In accordance with a possible aspect of the invention, the lower part has an upper side and the clamping element has a lower side, with the upper side and the lower side including an opening angle in the release position. The removal and the insertion of the knife blade are hereby simplified. The lower part can in particular have an abutment surface for the clamping element which bounds the opening angle.

The clamping device engages at the clamping element. The clamping device is preferably pivotally connected to the clamping element. It is particularly preferred if the clamping element has a rear actuation region at which the clamping device is pivotally connected or engages. If the clamping device is arranged beneath the clamping element, the rear actuation region of the clamping element can hereby be pressed upwardly to trigger the rotary movement or tilting movement of the clamping element. With a pivotal connection, the rear actuation region of the clamping element can be pressed upwardly or drawn downwardly—depending on the actuation direction—to trigger the rotary movement or tilting movement of the clamping element.

In accordance with a further possible aspect of the invention, the clamping element includes a front clamping region with which the knife blade can be clamped and a rear actuation region at which the clamping device engages, with the counter support being arranged in the release position and the clamping position between the front clamping region and the rear actuation region. A rocker-like arrangement is hereby provided for the clamping element, with the counter support holding the clamping element tight at the lower part, on the one hand, and enabling the rotary movement or tilting movement relative to the lower part, on the other hand.

The counter support and the clamping element preferably each include a coupling section, said coupling sections being arranged mutually engaging on the adjustment. The cooperation in accordance with the invention of the counter support with the clamping element can hereby be realized in a particularly simple manner.

In accordance with a further possible aspect of the invention, the clamping element can additionally be moved into a decoupling position and/or a cleaning position. The decoupling position and/or cleaning position is consequently at least one position of the clamping element different from the release position.

The clamping element is preferably decoupled from the counter support in the decoupling position and/or cleaning position. The counter support and the clamping element in particular no longer cooperate in the decoupling position and/or cleaning position as was described above. It is preferred if the clamping element can initially be moved into a decoupling position in which the clamping element is decoupled from the counter support and subsequently into a cleaning position in which the clamping element is completely pivoted away from the lower part. The knife holder is hereby particularly easily accessible for a cleaning.

All the positions of the clamping element are preferably adjustable by means of a single actuation lever.

In accordance with a further possible aspect of the invention, adjustable blocking means are provided which selectively suppress or allow a moving of the clamping element into the decoupling position and/or cleaning position. If the blocking means are in a blocking position, the clamping element is only adjustable between the clamping position and the release position. Consequently, it is in particular possible to switch between the "normal" clamping operation for the clamping tight or releasing of the knife and an additional cleaning operation for the cleaning of the knife holder using the blocking means.

The blocking means are preferably arranged in the position suppressing the movement such that the counter support and the clamping element are unreleasably coupled to one another. Coupling sections of the counter support and of the clamping element in particular mutually engage in a locking manner.

The blocking means, which are preferably rotatable about an axis, can, for example, include an abutment for the clamping element and/or for the clamping device. The abutment can be made, for example, to impede an actuation region of the clamping element and/or an end of the clamping device in a movement which can allow the clamping element to move out of engagement with the counter support without the abutment. For example, the abutment can be adjusted by rotation of the blocking means between an active position suppressing the above-mentioned movement and an inactive position in which the clamping element can be released from the lower part and can be pivoted into the mentioned cleaning position.

The invention furthermore relates to a derinding machine having a knife holding apparatus such as is described above.

Figure 2:
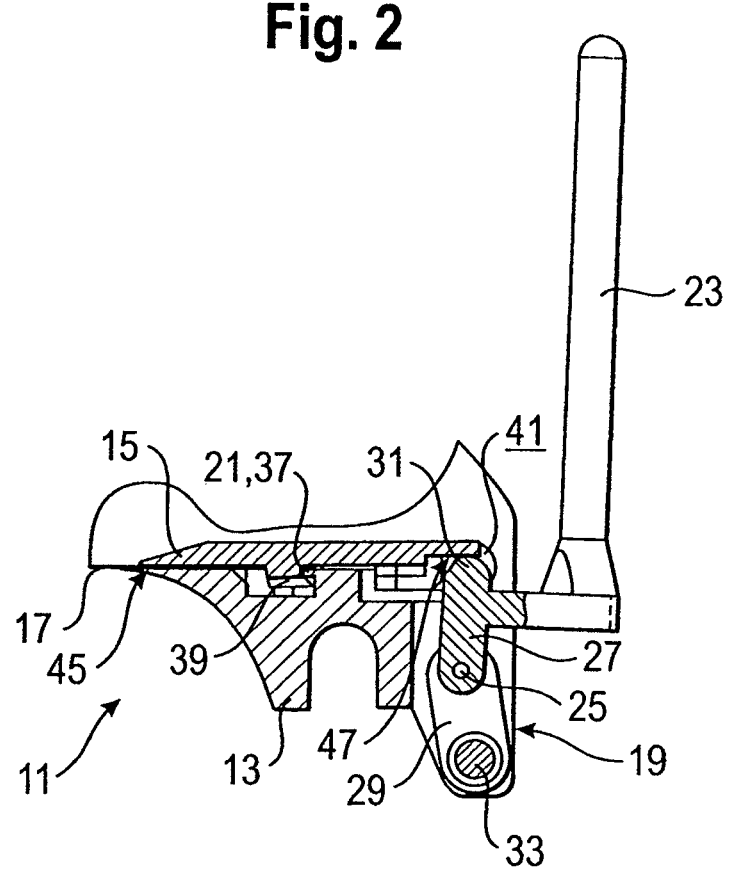
Figure 3:
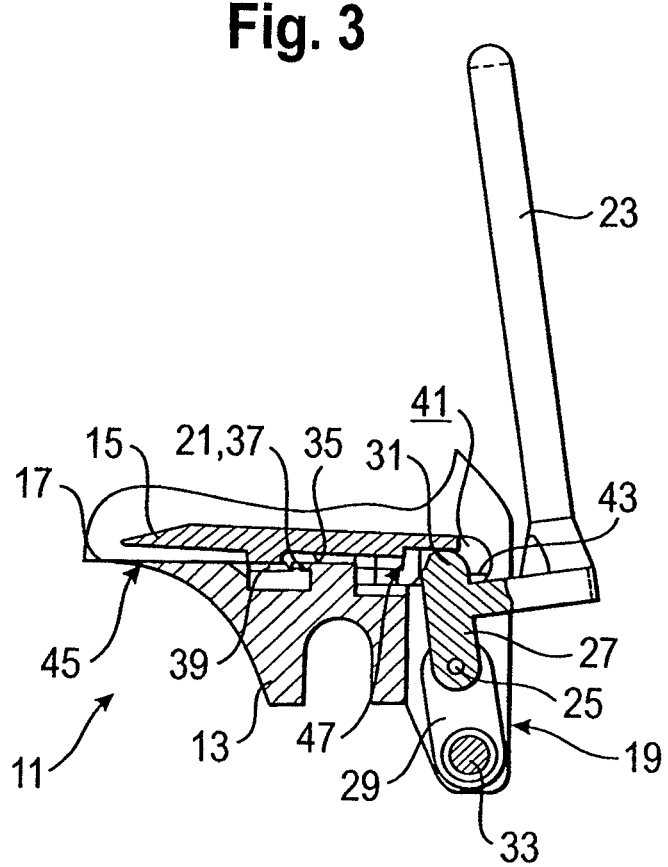
Figure 7:
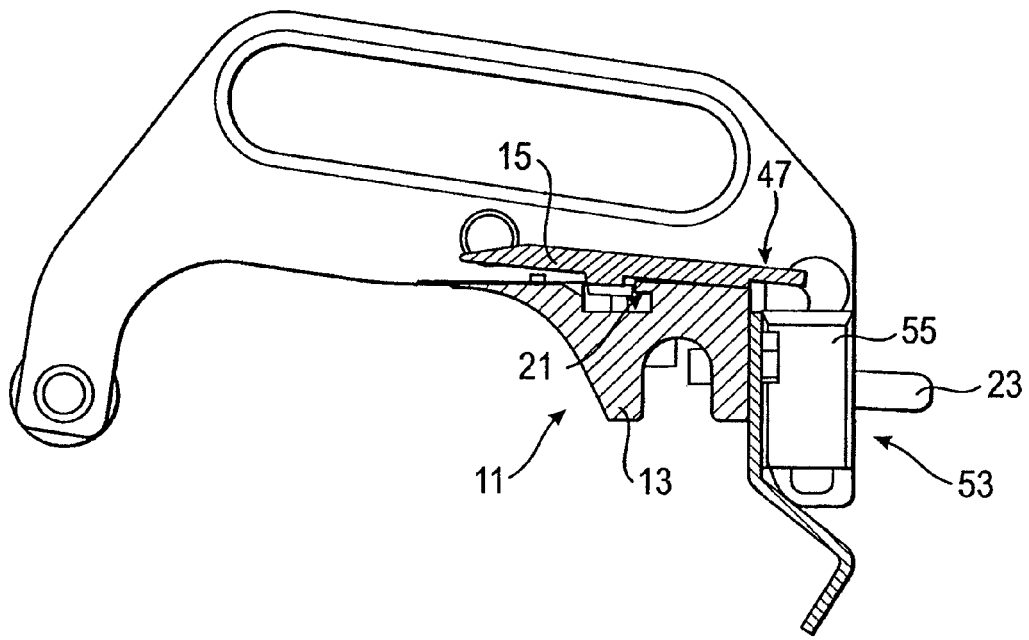
Figure 8:
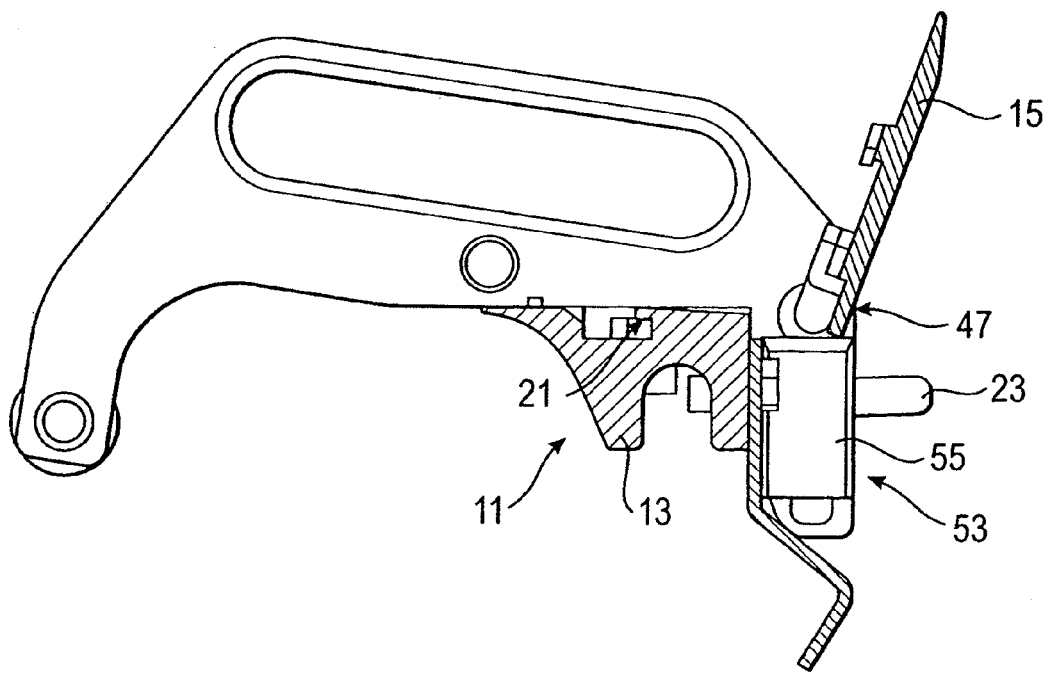

The invention will be described in the following by way of example with reference to the drawing. There are shown:

FIG. 1 a knife holding apparatus in accordance with an embodiment of the invention, with a clamping element being in a release position;

FIG. 2 the knife holding apparatus of FIG. 1, with the clamping element being in a clamping position;

FIG. 3 the knife holding apparatus of FIG. 1, with the clamping element being in a decoupling position; the knife holding apparatus of FIG. 1, with the clamping element being in a cleaning position, FIG. 5 a knife holding apparatus in accordance with a further embodiment of the invention, with a clamping element being in a release position;

FIG. 6 the knife holding apparatus of FIG. 5, with the clamping element being in a clamping position;

FIG. 7 the knife holding apparatus of FIG. 5, with the clamping element being in a decoupling position; and FIG. 8 the knife holding apparatus of FIG. 5, with the clamping element being in a cleaning position.

The knife holding apparatus shown in FIG. 1, which is in particular provided for a derinding machine, not shown, includes a knife holder 11. The knife holder 11 has a lower part 13 and a clamping plate 15 which is arranged above the lower part 13 in this representation. The clamping plate 15 is shown in a release position in FIG. 1.

In a front clamping region 45, the clamping plate 15 has a planar lower side which includes an opening angle $\alpha$ with a planar upper side present in a front clamping region of the lower part 13 so that a knife blade 17 can be inserted between the upper side of the lower part 13 and the lower side of the clamping plate 15 and can be clamped after adjustment of the clamping plate 15 from the release position of FIG. 1 into a clamping position which will be described with reference to FIG. 2 in the following. The lower part 13 has an abutment surface 35 for the clamping plate 15 which bounds the opening angle $\alpha$ formed between the planar upper side of the lower part 13 and the planar lower side of the clamping plate 15.

The lower part 13 has a counter support 21 for the clamping plate 15. The counter support 21 includes a coupling section 37, with the coupling section 37 of the counter support 21 and a coupling section 39 of the clamping plate 15 mutually engaging in a latching manner in the release position and in the clamping position so that a raising of the clamping plate 15 from the lower part 13 is prevented in these two positions. The two coupling sections 37, 39, which are in particular made in hook shape, each have a projection, with the projections in each case engaging into an undercut made in a complementary manner of the respective other coupling section 39, 37.

The knife holding apparatus furthermore includes a toggle lever 19 which acts as a clamping device for the adjustment of the clamping plate 15 between the release position and the clamping position. The toggle lever 19 has two one-armed clamping levers 27, 29 connected to one another by a joint 25. The one clamping lever 29 is pivotally connected at its end 33 disposed opposite the joint 25 to a housing of the knife holding apparatus. The other clamping lever 27 is pivotally connected at its end 31 disposed opposite the joint 25 to a rear actuation region 47 of the clamping plate 15 and is rigidly connected to an actuation lever 23. The toggle lever 19 is in an expanded, kinked position in the release position of the clamping plate 15 in accordance with FIG. 1.

For the adjustment of the clamping plate 15 from the release position shown in FIG. 1 into the clamping position shown in FIG. 2, the actuation lever 47 is actuated in an actuation device 51, whereby the toggle lever 19 is pushed through and is thus moved into a tensioned, stretched position. The clamping plate 15 is pressed upwardly in the actuation region 47 due to the pivotal connection of the end 31 of the clamping lever 27 of the toggle lever 19 to the actuation region 47 of the clamping plate 15. The clamping plate 15 is hereby set into a rotary movement and/or tilting movement, and indeed about the counter support 21 which is arranged between the clamping region 45 and the actuation region 47 of the clamping plate 15 in the release position and in the clamping position of the clamping plate 15 and holds the clamping plate 15 tight. As a consequence of this, the clamping region 45 of the clamping plate 15 is pressed downwardly so that the knife blade 17 inserted between the lower part 13 and the clamping plate 15 is clamped tight between the planar upper side of the lower part 13 and the planar lower side of the clamping plate 15. The toggle lever 19 is preferably in a stable position above dead center in the clamping position in accordance with FIG. 2.

The knife holding apparatus furthermore includes blocking means 41 which are rotatable about an axis 49 (FIG. 4) and which are attached to the housing of the knife holding apparatus in the region of the end 31 of the clamping lever 27 of the toggle lever 19. The blocking means 41 include an abutment 43 which is made as an elongate part-cylinder section and which is oriented vertically with a planar abutment surface in the release position and in the clamping position of the clamping plate 15, as can best be recognized in FIG. 1, and which supports the upper end 31 of the clamping lever 27 of the toggle lever 19. It is hereby prevented that the clamping plate 15 moves horizontally forward, in the direction of the clamping region 47, so that the latching engagement of the coupling sections 37, 39 of the counter support 21 and of the clamping plate 15 is maintained. The counter support 21 and the clamping element 15 are unreleasably coupled to one another.

The clamping plate 15 can also adopt a decoupling position, which is shown in FIG. 3, in addition to the release position and the clamping position. For this purpose, the blocking means 41 are rotated by 90° about the axis 49 so that the abutment 43, which is arranged eccentrically with respect to the axis 49, is now oriented horizontally with its abutment surface and the upper end 31 of the clamping lever 27 of the toggle lever 19 is no longer supported. It is hereby made possible that the clamping plate 15 can be moved horizontally forward by means of the actuation lever 23, in the direction of the clamping region 47, whereby the coupling sections 37, 39 of the counter support 21 and of the clamping plate 15 move out of engagement and are thereby decoupled from one another.

Figure 4:
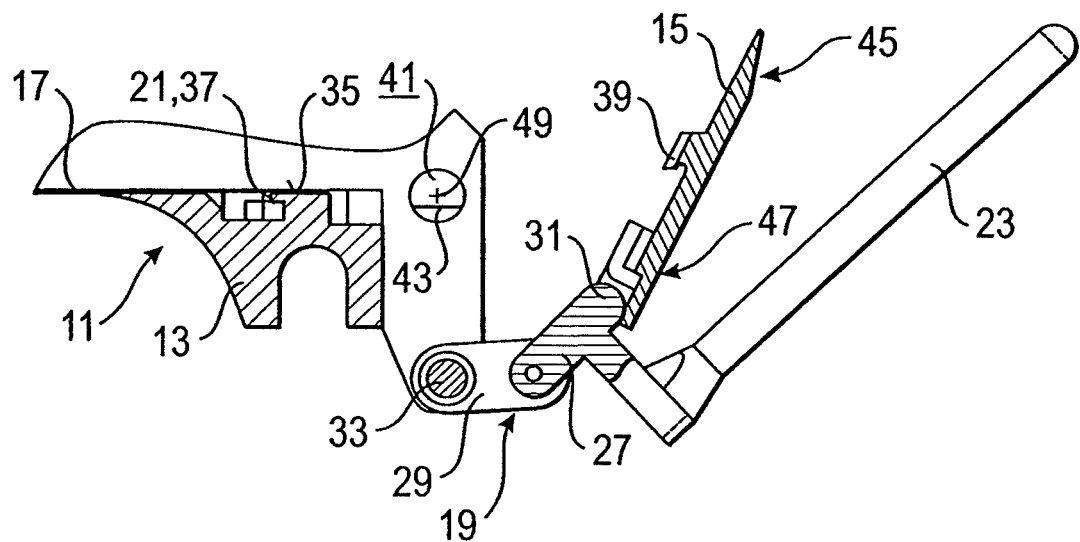

As a consequence of this, the clamping plate 15 can in turn be pivoted from the decoupling position shown in FIG. 3 into the cleaning position shown in FIG. 4 by means of the actuation lever 23 so that all the parts of the knife holding apparatus are easily accessible for a cleaning.

The profile of the knife holder 11 shown in FIGS. 1 to 4 is at least substantially constant over the total length of the knife blade 17 extending perpendicular to the plane of the drawing so that the knife blade 17 can be clamped areally over its total working length—and thus over the total working width of a machine equipped with the knife holder 11—between the clamping plate 15 and the lower part 13. The clamping apparatus is thus continuously active over the total knife length so that an extremely effective clamping of the knife can be achieved with a clamping mechanism having a relatively simple structure.

The knife holding apparatus in accordance with the invention thus has a quick-clamping device with which the knife blade 17 can be removed and installed particularly fast and easily, and in particular without tools, with an advantageous cleaning position additionally being possible in which regions of the knife holder to be cleaned are particularly easily accessible.

The further embodiment of a knife holding apparatus shown in FIGS. 5 to 8 differs from the embodiment shown in FIGS. 1 to 4 in that an eccentric device 53 is used as a clamping device instead of a toggle lever. The knife holder 11 is in contrast the same in both embodiments.

The knife holding apparatus is in each case shown in a side view in FIGS. 5*a*, 6*a*, 7 and 8. In FIGS. 5*b* and 6*b*, the knife holding apparatus is shown in each case in a rear view in the region of the eccentric device 53 which is attached to the rear side of the knife holding apparatus.

The eccentric device 53 includes a control disk 55 attached to a shaft 57, with the control disk 55 being arranged eccentrically with respect to the shaft axis. The control disk 55 is furthermore flattened out at a side, i.e. the control disk lacks one circle segment for a full circular disk. An actuation lever 23 is furthermore provided which is firmly connected to the control disk 55.

The clamping plate 15 of the knife holder 11 is in the release position in FIG. 5. The eccentric device 53 is located in an associated rotary release position in which the control disk 55 is oriented with its flattened out side in the direction of the rear actuation region 47 of the clamping plate 15. The control disk 55 therefore does not engage at the rear actuation region 47 of the clamping plate 15 in the rotary release position, but is rather arranged spaced apart from this, i.e. releases it.

To adjust the clamping plate 15 from the release position shown in FIG. 5 into the clamping position shown in FIG. 6, the actuation lever 23 is actuated along the actuation direction 51. The control disk 55 is hereby brought into the rotary clamping position shown in FIG. 6*b*, whereby the rear actuation region 47 of the clamping plate 15 is pressed upward due to the eccentric arrangement of the control disk 55. This has the effect that the clamping plate 15—analogously to the embodiment in accordance with FIGS. 1 to 4—is set into a rotary movement and/or tilting movement about the counter support 21. The rotary movement of the control disk 55 can consequently be converted into an upward movement of the rear actuation region 47 of the clamping plate 15.

To move the clamping plate into the decoupling position shown in FIG. 7, the eccentric device 53 is pivoted back into the rotary release position shown in FIG. 5 and—analogously to the embodiment in accordance with FIGS. 1 to 4—the abutment 41 (hidden) is rotated from its vertical orientation, in which it is in the release position and in the clamping position, into its horizontal orientation to enable the forward directed horizontal movement of the clamping plate 15 and the decoupling of the clamping plate 15 from the counter support 21.

The clamping plate 15 can subsequently be pivoted into the cleaning position shown in FIG. 8.

Reference Numeral List

11 knife holder
13 lower part
15 clamping element, clamping plate
17 knife blade
19 toggle lever
21 counter support
23 actuation lever
25 joint
27 clamping lever
29 clamping lever
31 end
33 end
35 abutment surface
37 coupling section
39 coupling section
41 blocking means
43 abutment
45 clamping region
47 actuation region
49 axis
51 actuation direction
53 eccentric device
55 control disk
57 shaft
$\alpha$ opening angle

The invention claimed is:

1. A knife holding apparatus for derinding machines, comprising:
   a knife holder which has a lower part and a clamping element of plate shape, wherein the clamping element is adjustable between a clamping position and a release position to selectively clamp or release a knife blade insertable between the lower part and the clamping element; and a clamping device engaging at the clamping element for the adjustment of the clamping element between the release position and the clamping position, wherein the lower part has a counter support for the clamping element which cooperates with the clamping element such that the clamping element carries out a rotary movement or a tilting movement about the counter support on the adjustment.

2. A knife holding apparatus in accordance with claim 1, wherein the clamping device has a length-changeable joint arrangement which is adjustable between a stretched position and a kinked position.

3. A knife holding apparatus in accordance with claim 1, wherein the clamping device has a toggle lever or an eccentric device which is adjustable by means of an actuation lever.

4. A knife holding apparatus in accordance with claim 3, wherein the toggle lever comprises two one-armed clamping levers which are connected to one another by a joint and which are likewise journaled in a jointed manner at their ends disposed opposite the joint; and/or in that the eccentric device includes a control disk which is rotatable about an axis, attached to a shaft and has a cam follower of at least part circle shape whose center is spaced apart from the axis.

5. A knife holding apparatus in accordance with claim 1, wherein the lower part has an upper side and the clamping element has a lower side, with the upper side and the lower side including an opening angle ($\alpha$) in the release position.

6. A knife holding apparatus in accordance with claim 5, wherein the lower part has an abutment surface for the clamping element which bounds the opening angle ($\alpha$).

7. A knife holding apparatus in accordance with claim 1, wherein the clamping device is pivotally connected to the clamping element.

8. A knife holding apparatus in accordance with claim 1, wherein the clamping element has a rear actuation region at which the clamping device is pivotally connected or engages.

9. A knife holding apparatus in accordance with claim 1, wherein the clamping element includes a front clamping region with which the knife blade can be clamped and a rear actuation device at which the clamping device engages, with the counter support being arranged between the front clamping region and the rear actuation region in the release position and in the clamping position.

10. A knife holding apparatus in accordance with claim 1, wherein the counter support and the clamping element each include a coupling section, said coupling sections mutually engaging on the adjustment.

11. A knife holding apparatus in accordance with claim 1, wherein the clamping element can additionally be moved into a decoupling position and/or cleaning position.

12. A knife holding apparatus in accordance with claim 11, wherein clamping element is decoupled from the counter support in the decoupling position and/or cleaning position.

13. A knife holding apparatus in accordance with claim 11, wherein adjustable blocking means are provided which selectively suppress or allow a movement of the clamping element into the decoupling position and/or cleaning position.

14. A knife holding apparatus in accordance with claim 13, wherein the blocking means are arranged in the position suppressing the movement such that the lower part and the clamping element are unreleasably coupled to one another in the region of the counter support.

15. A knife holding apparatus in accordance with claim 13, wherein the blocking means include an abutment for the clamping element and/or the clamping device.

16. A knife holding apparatus in accordance with claim 13, wherein the blocking means are rotatable about an axis for the adjustment.

17. A knife holding apparatus in accordance with claim 16, wherein an abutment of the blocking means is arranged eccentrically with respect to the axis.

18. A knife holding apparatus for derinding machines, comprising:

a knife holder which has a lower part and a clamping element of plate shape, wherein the clamping element is adjustable between a clamping position and a release position to selectively clamp or release a knife blade insertable between the lower part and the clamping element; and a clamping device engaging at the clamping element for the adjustment of the clamping element between the release position and the clamping position, wherein the clamping device includes a toggle lever or an eccentric device.

19. A knife holding apparatus in accordance with claim 18, wherein the lower part has a counter support for the clamping element which cooperates with the clamping element such that the clamping element carries out a rotary movement or a tilting movement about the counter support on the adjustment.

20. A derinding machine having a knife holding apparatus comprising:

a knife holder which has a lower part and a clamping element of plate shape, wherein the clamping element is adjustable between a clamping position and a release position to selectively clamp or release a knife blade insertable between the lower part and the clamping element; and a clamping device engaging at the clamping element for the adjustment of the clamping element between the release position and the clamping position, wherein the lower part has a counter support for the clamping element which cooperates with the clamping element such that the clamping element carries out a rotary movement or a tilting movement about the counter support on the adjustment.

21. A derinding machine having a knife holding apparatus comprising:

a knife holder which has a lower part and a clamping element of plate shape, wherein the clamping element is adjustable between a clamping position and a release position to selectively clamp or release a knife blade insertable between the lower part and the clamping element; and a clamping device engaging at the clamping element for the adjustment of the clamping element between the release position and the clamping position, wherein the clamping device includes a toggle lever or an eccentric device.

* * * * *

UNITED STATES PATENT AND TRADEMARK OFFICE
CERTIFICATE OF CORRECTION

Page 1 of 1

PATENT NO. : 8,414,364 B2
APPLICATION NO. : 12/598021
DATED : April 9, 2013
INVENTOR(S) : Weber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this
Eighteenth Day of November, 2014

Michelle K. Lee
*Deputy Director of the United States Patent and Trademark Office*